T. F. CAULK.
WAGON BRAKE.
APPLICATION FILED APR. 18, 1914.
1,147,677.
Patented July 20, 1915.
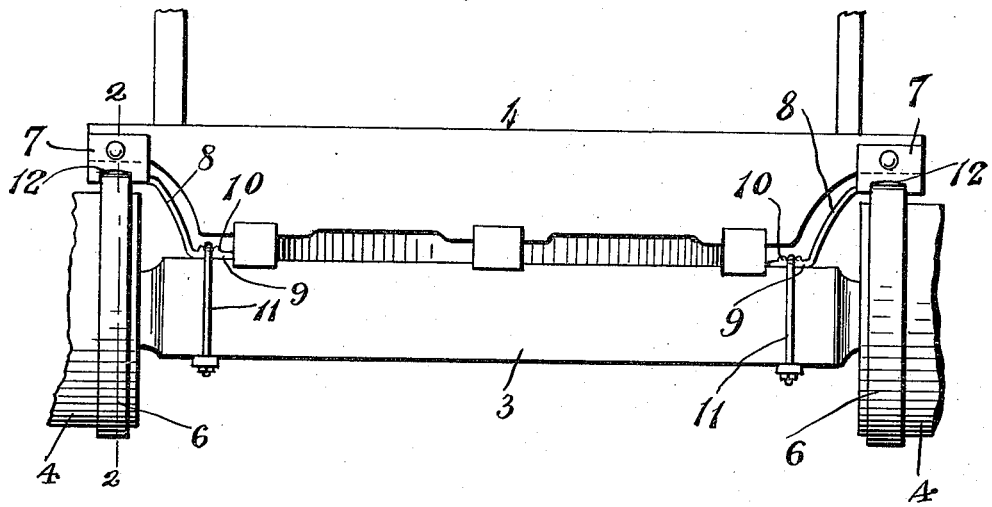
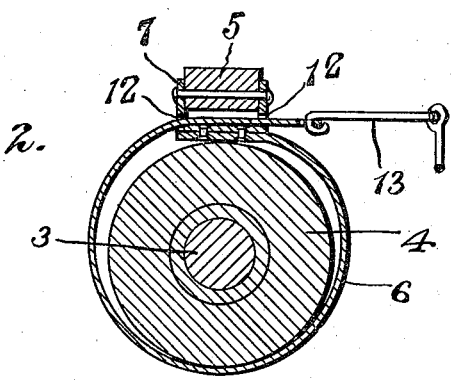
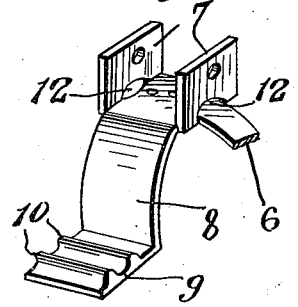
Witnesses
Inventor
T. F. Caulk
By
Attorney

UNITED STATES PATENT OFFICE.

THOMAS F. CAULK, OF OLD RIPLEY, ILLINOIS.

WAGON-BRAKE.

1,147,677.  Specification of Letters Patent.  Patented July 20, 1915.

Application filed April 18, 1914.  Serial No. 832,877.

*To all whom it may concern:*

Be it known that I, THOMAS F. CAULK, a citizen of the United States, residing at Old Ripley, in the county of Bond and State of Illinois, have invented certain new and useful Improvements in Wagon-Brakes, of which the following is a specification.

This invention relates to new and useful improvements in brakes, and has for its principal object to provide a wagon brake which may be easily and cheaply constructed and which will be carried by the frame of a wagon to avoid the necessity of removing the brake when it becomes necessary to change the style of wagon body.

The above and other objects in view, the invention consists in novel combination and arrangement of parts which will be fully set forth in the following specification and accompanying drawings, in which:

Figure 1 is an enlarged rear view of the bolster, axle and brake. Fig. 2 is a transverse sectional view of Fig. 1 taken on the line 2—2 of Fig. 1. Fig. 3 is a detail perspective view of one of the brake band supports.

Referring now to the drawings by characters of reference, the numeral 1 designates generally the wagon frame, which carries the usual axle 3 on which the wheels 4 are rotatably mounted.

The brakes which are used on the band type are arranged to act directly on the hub of the wheel, thus removing the necessity of using brake drums. These brakes consist of the band 6 which is riveted or otherwise secured to the U-shaped member 7, which U-shaped member is provided with the angular extension 8 which terminates in the plate 9 having a pair of spaced ribs 10 arranged to form a groove in which the bight portion of a U-bolt 11 lies. The free ends of the band 6 extend around the hubs of the wheels and project through the apertures 12 which are provided with suitable apertures through which the looped ends of the links 13 extend.

It will be apparent from the foregoing that in use the pull is exerted on the links 13 which will cause the brake bands 6 to contract and frictionally engage the hubs of the wheels and thereby lock the wheels against motion. As soon as the pull is released from the links 13 it will be apparent that the brake bands 6 will return to their normal expanded position and allow the wheels to rotate.

While in the foregoing there has been shown and described the preferred embodiment of this invention, it is to be understood that such changes may be made in the combination and arrangement of parts as will fall within the spirit and scope of the invention as defined in the appended claim.

Having thus described my invention, I claim:

In combination with a brake band, a support therefor comprising a U-shaped member, an angular extension formed from the vertex and extending downwardly and outwardly to form a plate thereon, said plate having transverse ribs thereon, the legs of said U-shaped member being provided with apertures, said legs to be secured to the bolster of a wagon and the angular extension to extend down and rest on the upper surface of the axle, and means for securing said support to the bolster and axle of a wagon.

In testimony whereof I affix my signature in presence of two witnesses.

THOMAS F. CAULK.

Witnesses:
 FRANK BEAN,
 MATHIAS HOFFMAN.

Copies of this patent may be obtained for five cents each, by addressing the "Commissioner of Patents, Washington, D. C."